(12) United States Patent
Kugler et al.

(10) Patent No.: US 7,331,096 B2
(45) Date of Patent: Feb. 19, 2008

(54) CUTTING TOOL

(75) Inventors: Gabor Kugler, Fagersta (SE); Kaj Virtanen, Fagersta (SE)

(73) Assignee: Seco Tools AB, Fagersta (SE)

( * ) Notice: Subject to any disclaimer, the term of this patent is extended or adjusted under 35 U.S.C. 154(b) by 306 days.

(21) Appl. No.: 11/162,630

(22) Filed: Sep. 16, 2005

(65) Prior Publication Data
US 2006/0062640 A1    Mar. 23, 2006

(30) Foreign Application Priority Data
Sep. 21, 2004    (SE) .................................... 0402282

(51) Int. Cl.
*B23B 27/04*    (2006.01)
(52) U.S. Cl. ............... 29/426.5; 29/525; 407/109; 407/50; 407/117; 82/160
(58) Field of Classification Search ........... 407/48–50, 407/117, 107–109; 29/525, 426.5, 428; 82/160
See application file for complete search history.

(56) References Cited

U.S. PATENT DOCUMENTS

| 13,096 | A | * | 6/1855 | Newton ............... 144/227 |
| 488,336 | A | * | 12/1892 | Newton ............... 83/845 |
| 867,275 | A | | 10/1907 | Hunter |
| 1,003,066 | A | | 9/1911 | Riblet |
| 1,080,422 | A | | 12/1913 | Cousot |
| 1,575,315 | A | | 3/1926 | Bowman |
| 2,156,726 | A | | 5/1939 | Fulke |
| 2,329,872 | A | | 9/1943 | Brownlee |
| 2,870,523 | A | | 1/1959 | Richard |
| 3,646,649 | A | | 3/1972 | Oaks et al. |
| 3,887,975 | A | * | 6/1975 | Sorice et al. ......... 407/47 |

(Continued)

FOREIGN PATENT DOCUMENTS

GB    169022    9/1921

(Continued)

OTHER PUBLICATIONS

Swedish Official Action from corresponding SE 0402282-8 (and English translation).

*Primary Examiner*—Monica Carter
*Assistant Examiner*—Sara Addisu
(74) *Attorney, Agent, or Firm*—WRB-IP LLP

(57) ABSTRACT

The present invention relates to cutting tools and, more particularly, to cutting tools having inserts and insert-receiving recesses with curved surfaces. The cutting tool includes a toolholder having a recess and an insert adapted to be received in the recess. The recess has a top surface with a curved portion, a bottom surface with a curved portion, and a fixed stop surface. The insert has a top surface with a curved portion, a bottom surface with a curved portion, and a stop surface. The curved portion of the top surface of the insert and the curved portion of the bottom surface of the insert are curved such that they abut against the curved portion of the top surface of the recess and the curved portion of the bottom surface of the recess, respectively, when the stop surface of the insert abuts against the fixed stop surface of the recess. The present invention also relates to a cutting tool kit, a cutting insert and a method for positioning an insert relative to a toolholder.

36 Claims, 4 Drawing Sheets

U.S. PATENT DOCUMENTS

| | | | |
|---|---|---|---|
| 4,443,136 A * | 4/1984 | Kemmer | 407/72 |
| 4,462,725 A * | 7/1984 | Satran et al. | 407/92 |
| 5,697,271 A | 12/1997 | Friedman et al. | |
| 5,795,109 A * | 8/1998 | Jonsson et al. | 407/72 |
| 5,846,032 A * | 12/1998 | Murakami | 407/102 |
| 5,934,843 A | 8/1999 | Brask et al. | |
| 5,980,165 A | 11/1999 | Hansson et al. | |
| 6,065,906 A * | 5/2000 | Hansson | 407/110 |
| 6,116,823 A * | 9/2000 | Mihic | 407/40 |
| 6,334,742 B1 * | 1/2002 | Shiraiwa | 407/110 |
| 6,572,309 B2 * | 6/2003 | Hansson et al. | 407/72 |
| 6,579,044 B1 | 6/2003 | Trenkwalder et al. | |
| 2002/0054792 A1 * | 5/2002 | Hansson et al. | 407/72 |
| 2002/0081165 A1 | 6/2002 | Hecht | |
| 2002/0176754 A1 * | 11/2002 | Barazani | 407/42 |

FOREIGN PATENT DOCUMENTS

| | | |
|---|---|---|
| JP | 8071811 | 3/1996 |
| WO | WO 9416851 | 8/1994 |

* cited by examiner

CUTTING TOOL

The present invention relates to cutting tools and, more particularly, to cutting tools having inserts and insert-receiving recesses with curved surfaces.

In cutting tools such as are commonly used in, for example, metal working applications, it is common to clamp a replaceable cutting insert in a recess formed in a toolholder. One type of toolholder clamps the insert in a recess defined by one or more elastic clamping arms or jaws. For example, U.S. Pat. No. 6,579,044 discloses clamping a cutting insert in a recess of a tool body using an elastic clamping arm that is adapted to be spread using a suitable spreading tool. Often, such cutting tools use a key-type spreading tool, embodiments of which are disclosed in, for example, U.S. Pat. No. 6,065,906 and U.S. Pat. No. 5,697,271.

Even when a spreading tool is capable of being used to spread a recess, it is often necessary to force the insert into the recess to properly seat it in the recess. Unfortunately, forcing the insert into the recess is often done using a tool such as a hammer that can damage the toolholder and the insert, particularly the cutting edge and chipbreaker portions of the insert. During removal of inserts, the inserts are often removed using tools such as hammers or pliers which, again, can damage the insert and the toolholder.

According to an aspect of the present invention, a cutting tool includes a toolholder having a recess and an insert adapted to be received in the recess. The recess has a top surface with a curved portion, a bottom surface with a curved portion, and a fixed stop surface, and the insert has a top surface with a curved portion, a bottom surface with a curved portion, and a stop surface. The curved portion of the top surface of the insert and the curved portion of the bottom surface of the insert are curved such that they abut against the curved portion of the top surface of the recess and the curved portion of the bottom surface of the recess, respectively, when the stop surface of the insert abuts against the fixed stop surface of the recess.

In accordance with another aspect of the invention, a cutting tool kit includes a toolholder having a recess, and an insert adapted to be received in the recess. The recess has a top surface with a curved portion, a bottom surface with a curved portion, and a fixed stop surface. The insert has a top surface with a curved portion, a bottom surface with a curved portion, and a stop surface. The curved portion of the top surface of the insert and the curved portion of the bottom surface of the insert are curved such that they abut against the curved portion of the top surface of the recess and the curved portion of the bottom surface of the recess, respectively, when the stop surface of the insert abuts against the fixed stop surface of the recess. When the insert is disposed in the recess, the curved portion of the top surface of the insert, the curved portion of the bottom surface of the insert, the curved portion of the top surface of the recess and the curved portion of the bottom surface of the recess define segments of substantially concentric circles. The toolholder includes a hole disposed at a center of the substantially concentric circles. A key is provided and has a first end receivable in the hole and a second end pivotable about the hole and adapted to contact a front end of the insert.

In accordance with another aspect of the present invention, a cutting insert includes a body including a top surface, a bottom surface, and left and right sidewalls extending between the top surface and the bottom surface, the top surface including a curved portion and the bottom surface defines a curved portion, the curved portion of the top surface and the curved portion of the bottom surface defining segments of substantially concentric circles. The body also includes front and rear faces extending between the top and bottom surfaces. An intersection of the front face and the bottom surface defining a cutting edge. The insert defines an arc of not less than 15° and not more than 90° between its front and rear faces.

In accordance with still another aspect of the present invention, a method for positioning an insert relative to a toolholder is provided. According to the method, an insert having front surface, a top surface, a bottom surface, and a stop surface is positioned at a front end of a recess in a toolholder, the recess having a top surface and a bottom surface. A first end of a key tool is positioned in a hole in the toolholder, the top surface of the insert including a curved portion, the bottom surface of the insert including a curved portion, the top surface of the recess including a curved portion, and the bottom surface of the recess including a curved portion, and the hole in the toolholder being disposed at a centerpoint of substantially concentric circles along which the curved portion of the top surface of the insert, the curved portion of the bottom surface of the insert, the curved portion of the top surface of the recess, and the curved portion of the bottom surface of the recess are disposed. A second end of the key tool is positioned against the front surface of the insert. The key tool is pivoted about the hole such that the second end of the key tool contacts and applies a force to the front surface of the insert through the second end of the key tool until the stop surface of the insert abuts against a stop surface of the recess.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
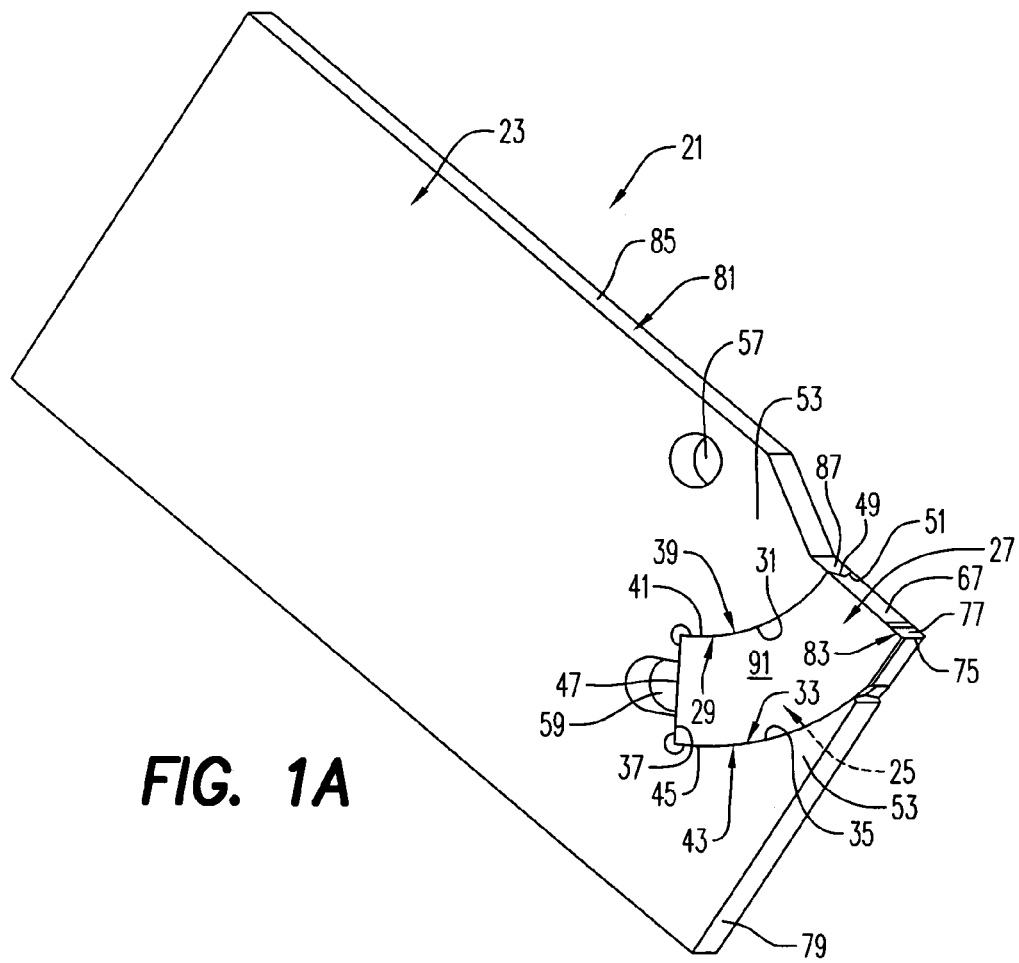
FIGS. 1A and 1B are perspective views of a cutting tool according to an embodiment of the present invention, showing an insert mounted in a toolholder and removed from the toolholder, respectively.
Figure 1B:
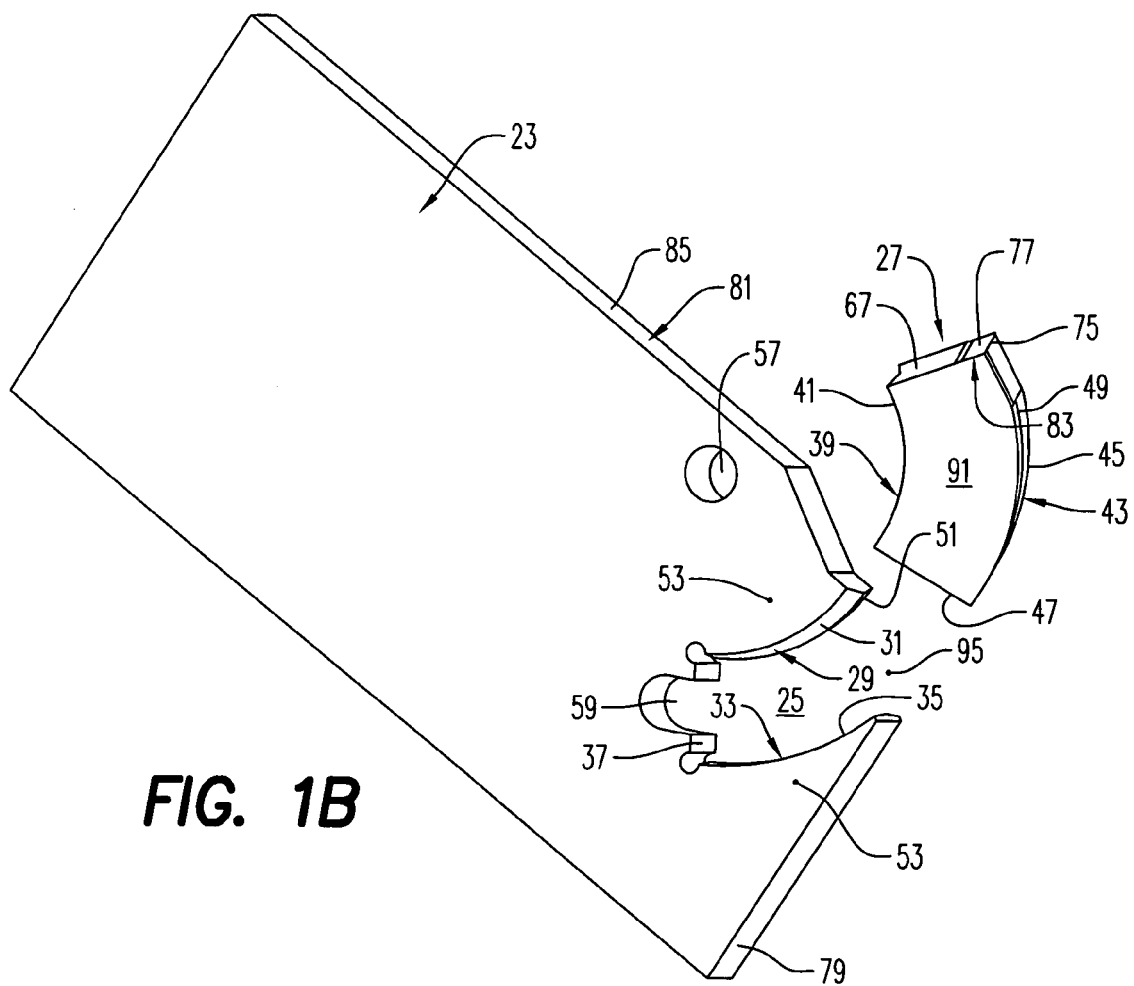

A cutting tool 21 according to an embodiment of the present invention is shown in FIGS. 1A and 1B. The cutting tool 21 includes a toolholder 23 having a recess 25 and an insert 27 adapted to be received in the recess. The recess 25 has a top surface 29 with a curved portion 31 and a bottom surface 33 with a curved portion 35, and a rear surface 37. The rear surface 37 functions as a stop surface and may be fixed or immovable but a movable surface, such as a locating screw, may be provided. In the illustrated embodiment, the curved portions 31 and 35 extend the entire length of the top surface 29 and the bottom surface 33, respectively. However, if desired, the curved portions 31 and 35 may extend only along a portion of the lengths of the top and bottom surfaces 29 and 33.

The insert 27 has a top surface 39 with a curved portion 41, a bottom surface 43 with a curved portion 45, and a rear surface 47 that functions as a stop surface. In an embodiment of the invention, the curved portions 41 and 45 of the top and bottom surfaces 39 and 43 are curved such that they abut against the curved portions 31 and 35 of the top and bottom surfaces 29 and 33 of the recess 25, respectively, when the rear surface 47 of the insert abuts against the rear surface 37 of the recess, i.e., the two stop surfaces abut, but not necessarily only when the rear surfaces 37 and 47 abut. In other words, the curved portions 41 and 45 of the top and bottom surfaces 39 and 43 may abut against the curved portions 31 and 35 of the top and bottom surfaces 29 and 33 of the recess 25, respectively, before the stop surfaces abut, as well.

Figure 5:
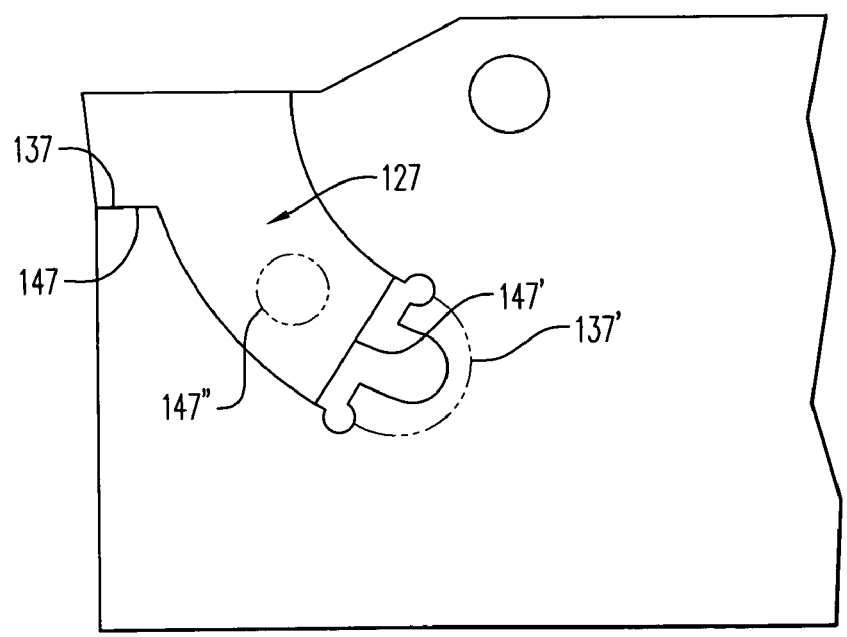
FIG. 5 is a side plan view of a portion of a cutting tool according to an embodiment of the present invention.

The present invention will primarily be described in connection with embodiments wherein rear surfaces of the insert and the recess function as stop surfaces. It will be appreciated, however, that surfaces other than rear surfaces of the insert and recess may function as stop surfaces. As seen, for example, in FIG. 5, stop surfaces 137 and 147 of an insert 127 can include a variety of surfaces that are non-tangential to the top and bottom surfaces of the recess and the insert and that function to prevent the insert from moving further into the recess. Such stop surfaces are not necessarily disposed at an end of the insert or the recess, and the ends of the insert and the recess need not and ordinarily will not be in contact when the insert is inserted into the recess as deeply as possible. Such stop surfaces may, for example, extend from the top or bottom surfaces of the recess or insert between points that could be considered to be front or rear ends of the recess or insert. If desired, the recess may be formed with a rear surface 137' (shown in phantom) that is substantially larger than a rear surface 147' of the insert.

Figure 2:
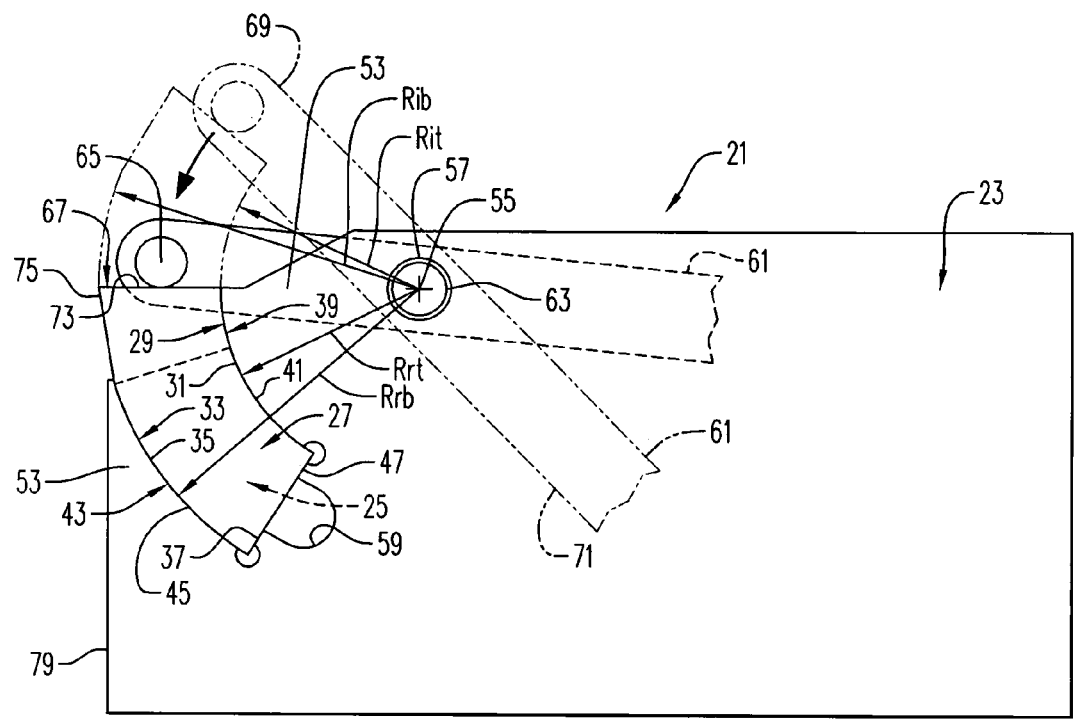
FIG. 2 is a side plan view of a cutting tool according to an embodiment of the present invention showing how an insert can be installed in a recess in a toolholder.

As seen, for example, in FIG. 2, the curved portion 41 of the top surface 39 of the insert 27 may have substantially the same radius of curvature Rit as the radius of curvature Rrt of the corresponding curved portion 31 of the top surface 29 of the recess 25. Similarly, the curved portion 45 of the bottom surface 43 of the insert 27 may have substantially the same radius of curvature Rib as the radius of curvature Rrb of the corresponding curved portion 35 of the bottom surface 33 of the recess 25. Also, both the curved portions 41 and 45 of the top and bottom surfaces 39 and 43 of the insert 27 may have radii of curvature Rit and Rib that are substantially the same as the radii of curvature Rrt and Rrb of the corresponding curved portions 31 and 35 of the top and bottom surfaces 29 and 33 of the recess 25, respectively.

References to radii of curvature of curved portions of the insert 27 and recess 25 should be understood to include average radii of curvature. The curved portions may have different radii of curvature at different points across a width of the insert 27 or the recess 25. For example, to assist in retaining and positioning the insert 27 in the recess 25, the curved portions 41 and 45 of the top and bottom surfaces 39 and 43 of the insert may include grooves or protrusions along all or part of their length that mate with corresponding protrusions or grooves on all or part of the length of the curved portions 31 and 35 of the top and bottoms surfaces 29 and 33 of the recess. Such groove and protrusion arrangements can improve lateral stability of the insert relative to the toolholder. As seen in FIGS. 1A and 1B, the curved portions 41 and 45 of the top and bottom surfaces 39 and 43 of the insert 27 may include V-shaped grooves 49 and the curved portions 31 and 35 of the top and bottoms surfaces 29 and 33 of the recess 25 may include V-shaped protrusions 51. Shapes other than single V-shaped grooves and protrusions may also be provided, such as substantially square shapes, shapes that are truncated triangles in cross-section, or serrations comprised of plural grooves and protrusions. It will be appreciated that this list of possible shapes is merely illustrative, not restrictive.

The insert 27 and the recess 25 and their respective curved portions may be shaped so that the insert is adapted to slide relative to the recess during insertion and removal of the insert. The recess 25 can be provided with dimensions such that, when the insert 27 is seated in the recess with, for example, its rear surface 47 abutting the rear surface 37 of the recess (or when other non-rear surface stop surfaces abut), a force for holding or clamping the insert in place is exerted on the insert by the toolholder. The recess 25 can be shaped so that, when the insert 27 is in place in the recess, the toolholder is slightly elastically deformed. For example, a clamping arm or jaw portion 53 of the toolholder may be bent elastically such that the recess is marginally wider between at least parts of the top and bottom surfaces 29 and 33 when the insert 27 is fully received in the recess than when the recess is empty. The part 53 toward the front edge 79 will ordinarily be more rigid and, if desired, a slot or other structure to facilitate separating the part 53 toward the front edge 79 from the part 53 toward the top edge 81 can be provided.

When the insert 27 is disposed in the recess 25, the curved portions 41 and 45 and 31 and 35 of the top and bottom surfaces 39 and 43 of the insert and the top and bottom surfaces 29 and 33 of the recess may define segments of substantially concentric circles. In other words, Rit, Rib, Rrt, and Rrb may all have substantially common centerpoints 55. Before the insert 27 is inserted into the recess 25, an average radius of curvature Rit of the curved portion 41 of the top surface 39 of the insert 27 will ordinarily be not more than the average radius of curvature Rrt of the curved portion 31 of the top surface 29 of the recess 25, and an average radius of curvature Rib of the curved portion 45 of the bottom surface 43 of the insert will ordinarily be not less than an average radius of curvature Rrb of the curved portion 35 of the bottom surface 33 of the recess. This is because it is desirable that the recess 25 be slightly smaller than the insert 27 so that the toolholder 23 will exert a clamping force on the insert. After insertion of the insert 27 into the recess 25, the recess will, of course, ordinarily have been expanded somewhat so that the dimensions of the recess 25 between the top and bottom surfaces 29 and 33 are slightly larger than the dimensions of the insert 27 between its top and bottom surfaces 39 and 43. If desired, the centerpoints from which Rit and Rib extend and from which Rrt and Rrb extend may be offset relative to one another so that the insert 27 and the recess 25 taper in terms of the distance between the top and bottom surfaces of the insert and the recess from the front toward the back, i.e., the insert and/or the recess have a wedge shape.

A hole 57 may be provided in the toolholder 23 disposed at the center 55 of the substantially concentric circles. Additionally, the rear surface 37 of the recess 25 may be provided with a recessed area 59. As seen in FIG. 2, a key 61 having a first end 63 receivable in the hole 57 and a second end 65 pivotable about the hole, i.e., about the centerpoint 55, and is adapted to contact a front end 67 of the insert 25. By turning the key 61 so that the second end 65 pivots about the centerpoint 55 and applies a force to the front end 67 of the insert 27, the key can be used to install the insert in the recess 25. When the second end 65 of the key 61 pivots around the centerpoint 55, it can define an arc of a circle that is concentric with the curved portions 31 and 35 and 41 and 45 of the top and bottom surfaces 29 and 33 and 39 and 43 of the recess 25 and the insert 27.

Figure 3:
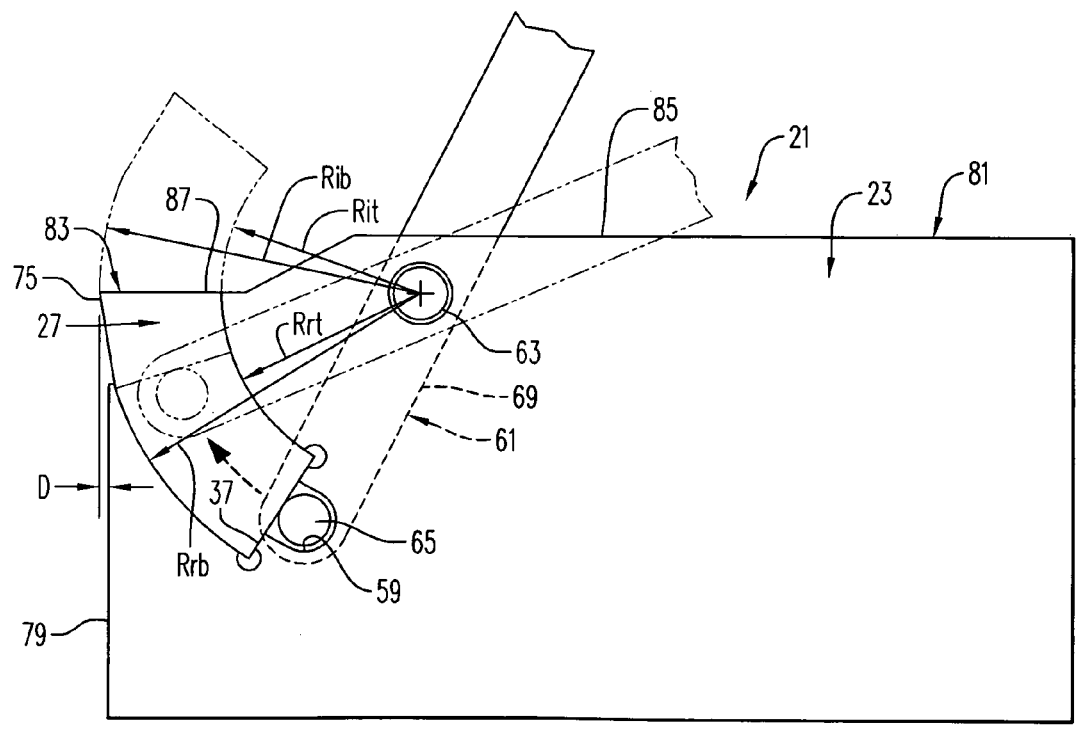
FIG. 3 is a side plan view of a cutting tool according to an embodiment of the present invention showing how an insert can be removed from a recess in a toolholder.

The key 61 can be of any suitable shape. A suitable key 61 in the form of a lever having a shorter portion 69 extending perpendicularly from the first end 63 of the key and on which the second end 65 of the key is disposed, and a longer portion 71 also extending perpendicularly from the first end 63 of the key and that may be used as a handle is shown in FIGS. 2 and 3.

The key abutment portion 73 of the front end 67 of the insert 27 that is contacted by the second end 65 of the key 61 can be formed without complicated shapes to minimize the possibility of damage to the insert during installation. For example, the cutting edge 75, chipbreakers 77, and other relatively complex shapes can be remote from the contact or key abutment portion 73, such as by forming the insert such that the key abutment portion of the front end of the insert that is contacted by the second end 65 of the key is raised relative to the chipbreakers or other shapes. This is shown in phantom in FIG. 6 where the key abutment portion 273 is raised relative to the cutting edge 275 and a chipbreaker region 277. Ordinarily, the cutting edge 75 will be adjacent the chipbreakers 77 and the bottom surface 43 of the insert 27. The chipbreakers 77 will, in turn, ordinarily be adjacent either the key abutment portion 73 or a stop surface. The key abutment portion 73 will, when the insert 27 is inserted in the recess 25, ordinarily include at least a portion that is tangent to a straight line extending through the centerpoint 55 of the hole 57 and that will be contacted by the second end 65 of the key 61. For indexable inserts, it will be appreciated that the rear and the front of the insert will have similar shapes. It will be appreciated that the key abutment portion need not necessarily be disposed at an end of the insert and may, for example, include a surface or surfaces of a protrusion extending from side of the insert or a surface of a hole 147" formed in the insert itself, as seen in phantom in FIG. 5.

The recessed area 59 at the rear surface 37 of the recess 25 may be sufficiently large to permit the second end 65 of the key 61 to be received in the recessed area and contact the rear surface 47 of the insert 27. As seen in FIG. 3, the key 61 can be used to remove an insert 27 from the recess 25 by applying a force against the rear surface 47 of the insert. The recessed area 59 can also reduce the amount of area at the rear surface 37 of the recess 25 that must meet tight manufacturing tolerances to ensure proper positioning of the insert 27 upon installation.

Figure 4:
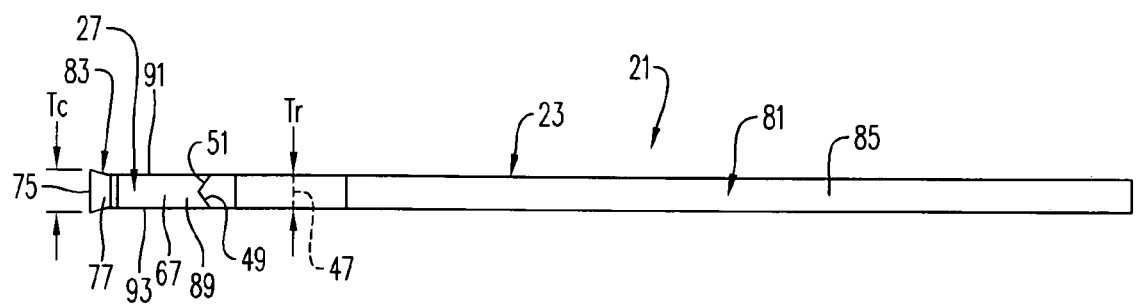
FIG. 4 is a top plan view of a cutting tool according to an embodiment of the present invention.

The present invention can be applied to a wide range of cutting tools, although it is presently anticipated that it will be particularly useful in tools such as grooving and parting tools of the general type seen in the Figures, and in slot milling disks. In the tool 21 seen in FIGS. 1A-3, the toolholder 23 includes a front edge 79 and a top edge 81. The recess 25 can extend inwardly from a corner of the tool between the front and top edges 79 and 81. The recess 25 may be positioned on the toolholder 23 so that the cutting edge portion 83 of the insert 27 is exposed when the insert is disposed in the recess and the rear surface 47 of the insert abuts against the rear surface 37 of the recess. As seen in, for example, FIG. 3, the cutting edge portion 83 includes the cutting edge 75, and the cutting edge can extend a distance D forward of the front edge 79 of the toolholder 23. In this way, a clearance is formed beneath the cutting edge. To facilitate clearance at a rear of the insert 27, as seen in FIG. 4, the insert can have a thickness Tr at the rear surface 47 that is thinner than a thickness Tc at the cutting edge portion 83 of the insert.

Figure 6:
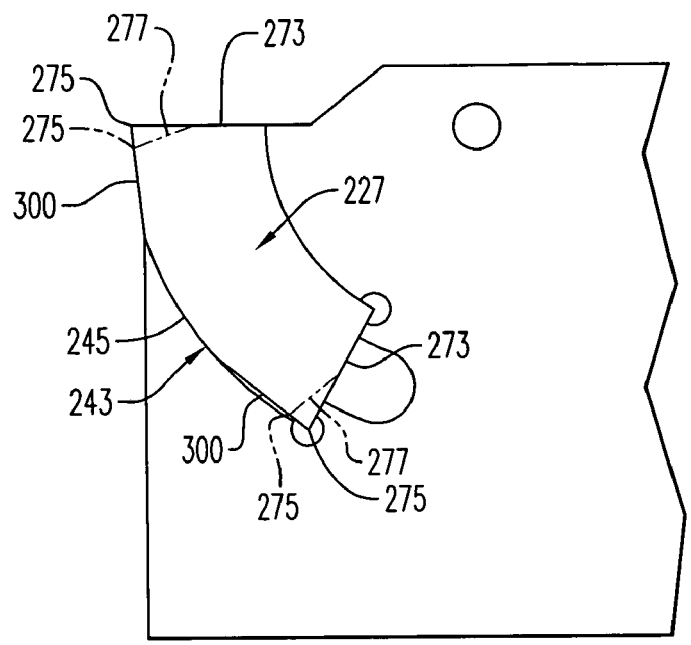
FIG. 6 is a side plan view of a portion of a cutting tool with an indexable insert according to an embodiment of the present invention.

Of course, if desired, the insert 27 can be indexable and have substantially the same shape at the rear surface 47 of the insert as at the front end 67. An indexable insert 227 that includes two cutting edges 275 is shown in FIG. 6. Beneath the cutting edges 275, the bottom surface 243 of the insert 227 may include a variety of shapes, such as two substantially flat clearance surfaces 300 separated by one or more curved portions 245. It will be appreciated that flat clearance surfaces need not necessarily be provided in any embodiments of the present invention. The front and rear surfaces of the insert may include chipbreaker structures and structures intended to be contacted by a key as well as stop surfaces that contact the rear surface of the recess.

The top edge 81 can include a raised portion 85 proximate the hole 57 and a lower portion 87 proximate the cutting edge portion 83. Such an arrangement can provide additional strength to the toolholder 23 in the vicinity of the hole 57.

A form of insert 27 suitable for use in connection with the present invention is seen in FIGS. 1A-4. The insert 27 includes body 89 formed from a suitable material, such as a sintered powder. The body 89 includes the top surface 39, the bottom surface 43. Left and right sidewalls 91 and 93 (FIG. 4) can extend between the top surface 39 and the bottom surface 43. The top and bottom surfaces 39 and 43 can include the curved portions 41 and 45. The curved portions 41 and 45 may define segments of substantially concentric circles. The body 89 can also include front and rear faces 67 and 47, respectively, extending between the top and bottom surfaces 39 and 43. An intersection of the front face 67 and the bottom surface 43 can define the cutting edge 75. In inserts 27 of the type shown in FIGS. 1A-4, a length of the insert between the front and rear faces 67 and 47 is typically substantially greater than a length of the cutting edge 75.

It is desirable that the insert 27 define an arc that is not more than 90°. It is presently considered that the shorter the arc defined by the insert 27 and the recess 25, the easier and less expensive it will be to manufacture the insert. It is also desirable that the insert 27 defines an arc that is not less than 15°. It is desirable that the portion of the bottom surface 43 proximate the cutting edge 75 be substantially tangent to a direction of cutting force (ordinarily applied in a direction parallel to the front edge 79). It is also presently considered desirable that an insert 27 and recess 25 combination extending through at least an arc of 15° be provided to ensure that a sufficient amount of material of the toolholder 23 in the region between the bottom surface 33 of the toolholder proximate the front edge 79 is provided. Also, if the insert 27 is an indexable insert, it will ordinarily be desirable that the insert extend through an arc not less than 15°. It is still further desirable that the insert 27 define an arc that is not less than 60° and not more than 90°. It is presently considered that an insert that defines an arc of about 60° is particularly desirable.

An aspect of the present invention also includes a method for positioning the insert 27 relative to the toolholder 23. As seen in FIG. 2, the insert 27, which can include the front surface 67, the top surface 39 with curved portion 41, the bottom surface 43 with curved portion 45, and the rear surface 47 is positioned at a front end 95 of the recess 25, which can include the top surface 29 with the curved portion 31 and the bottom surface 33 with the curved portion 35. The first end 63 of the key tool 61 is inserted in the hole 57 at the centerpoint 55 of substantially concentric circles along which the curved portions 41 and 45 of the top and bottom surfaces 39 and 43 of the insert 27 and the curved portions 31 and 35 of the top and bottom surfaces 29 and 33 of the recess are disposed. The second end 65 of the key tool 61 is positioned against the front surface 67 of the insert 27. The key tool 61 is pivoted about the hole 57 such that the second end 65 of the key tool contacts and applies a force to the front surface 67 of the insert 27 through the second end of the key tool until the rear surface 47 of the insert abuts against the rear surface 37 of the recess 25. The front surface 67 of the insert 27 may include a cutting edge portion 83 and a key abutment portion 73 remote from the cutting edge portion, and the second end 65 of the key tool 61 can contact the front surface of the insert at the contact portion instead of at the cutting edge portion, thereby reducing the risk of damage to the cutting edge portion. In this way, it can be possible to minimize damage to the insert 27 during insertion, such as might occur by pounding on the insert to force it into position in the recess 25.

To remove the insert 27 from the recess 25, as seen in FIG. 3, the second end 65 of the key tool 61 is positioned proximate the rear surface 47 of the insert in the recessed area 59 in the rear surface 37 of the recess of the toolholder 23, and the first end 63 of the key tool is positioned in the hole 57. The second end 65 of the key tool 61 is pivoted around the centerpoint 55 in the hole 57 and contacts the rear surface 47 of the insert 27, applying a force to move the insert out of the recess. In this way, it can be possible to minimize damage to the insert 27 during removal, such as might occur using pliers or other less suitable tools.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with preferred embodiments, it is recognized that variations and changes may be made therein without departing from the invention as set forth in the claims.

What is claimed is:

1. A cutting tool, comprising:
a toolholder having a recess; and
an insert adapted to be received in the recess,
wherein the recess has a top surface with a curved portion, a bottom surface with a curved portion, and a fixed stop surface, and the insert has a top surface with a curved portion, a bottom surface with a curved portion, at least part of the bottom surface at least partially defining a clearance surface, and a stop surface, the curved portion of the top surface of the insert and the curved portion of the bottom surface of the insert being curved such that they abut against the curved portion of the top surface of the recess and the curved portion of the bottom surface of the recess, respectively, when the stop surface of the insert abuts against the fixed stop surface of the recess, and wherein the curved portion of the top surface of the insert and the curved portion of the bottom surface of the insert define segments of substantially concentric circles having radii that differ by an amount substantially equal to a distance along a side surface between the top surface and the bottom surface of the insert.

2. The cutting tool as set forth in claim 1, wherein the curved portion of the top surface of the insert has substantially the same radius of curvature as the corresponding curved portion of the top surface of the recess.

3. The cutting tool as set forth in claim 1, wherein the curved portion of the top surface of the insert and the curved portion of the bottom surface of the insert have substantially the same radius of curvature as the curved portion of the top surface of the recess and the curved portion of the bottom surface of the recess, respectively.

4. The cutting tool as set forth in claim 1, wherein, when the insert is disposed in the recess, the curved portion of the top surface of the insert and the curved portion of the bottom surface of the insert and the curved portion of the top surface of the recess and the curved portion of the bottom surface of the recess define segments of substantially concentric circles.

5. The cutting tool as set forth in claim 4, wherein, before the insert is inserted in the recess, an average radius of curvature of the curved portion of the top surface of the insert is not more than the average radius of curvature of the curved portion of the top surface of the recess, and an average radius of curvature of the curved portion of the bottom surface of the insert is not less than an average radius of curvature of the curved portion of the bottom surface of the recess.

6. The cutting tool as set forth in claim 4, wherein the toolholder includes a hole disposed at the center of the substantially concentric circles.

7. The cutting tool as set forth in claim 6, wherein the fixed stop surface of the recess includes a recessed area.

8. The cutting tool as set forth in claim 6, wherein the cutting tool includes a key having a first end receivable in the hole and a second end pivotable about the hole and adapted to contact a front end of the insert.

9. The cutting tool as set forth in claim 8, wherein the fixed stop surface of the recess includes a recessed area and the second end of the key is adapted to be received in the recessed area and contact a rear surface of the insert.

10. The cutting tool as set forth in claim 8, wherein the insert includes a surface adapted to be contacted by the second end of the key.

11. The cutting tool as set forth in claim 1, wherein the toolholder includes a front edge and a top edge, the recess extending inwardly from the front and top edges.

12. The cutting tool as set forth in claim 11, wherein the insert includes a cutting edge portion, the cutting edge portion of the insert being exposed when the insert is disposed in the recess and the stop surface of the insert abuts against the stop surface of the recess.

13. The cutting tool as set forth in claim 11, wherein the cutting edge portion includes a cutting edge, the cutting edge extending forward of the front edge of the toolholder.

14. The cutting tool as set forth in claim 1, wherein the curved portion of the top surface of the insert and the curved portion of the bottom surface of the insert each include grooves or protrusions and mate with corresponding protrusions or grooves on the curved portion of the top surface of the recess and the curved portion on the bottom surfaces of the recess.

15. The cutting tool as set forth in claim 14, wherein the grooves or protrusions on the top surface of the insert, the grooves or protrusions on the bottom surface of the insert, the protrusions or grooves on the top surface of the recess, and the protrusions or grooves on the bottom surface of the recess are V-shaped.

16. The cutting tool as set forth in claim 1, wherein the insert is thinner at a rear surface than at a cutting edge portion of the insert.

17. The cutting tool as set forth in claim 1, wherein the insert is indexable.

18. The cutting tool as set forth in claim 17, wherein a cutting edge is disposed at each end of the bottom surface of the insert.

19. The cutting tool as set forth in claim 18, wherein the bottom surface of the insert includes a clearance surface adjacent each cutting edge.

20. The cutting tool as set forth in claim 19, wherein each clearance surface is substantially flat.

21. The cutting tool as set forth in claim 1, wherein the fixed stop surface of the recess is disposed at a rear surface of the recess and the stop surface of the insert is disposed at a rear surface of the insert.

22. The cutting tool as set forth in claim 1, wherein the fixed stop surface of the recess is disposed remote from a rear surface of the recess and the stop surface of the insert is disposed remote from a rear surface of the insert.

23. A cutting tool kit, comprising:
a toolholder having a recess;
an insert adapted to be received in the recess,
wherein the recess has a top surface with a curved portion, a bottom surface with a curved portion, and a fixed stop surface, and the insert has a top surface with a curved portion, a bottom surface with a curved portion, at least part of the bottom surface at least partially defining a clearance surface, and a stop surface, the curved portion of the top surface of the insert and the curved portion of the bottom surface of the insert being curved such that they abut against the curved portion of the top surface of the recess and the curved portion of the bottom surface of the recess, respectively, when the stop surface of the insert abuts against the fixed stop surface of the recess, wherein, when the insert is disposed in the recess, the curved portion of the top surface of the insert, the curved portion of the bottom surface of the insert, the curved portion of the top surface of the recess and the curved portion of the bottom surface of the recess define segments of substantially concentric circles, the toolholder including a hole disposed at a center of the substantially concentric circles, and the cutting tool kit includes a key having a first end receivable in the hole and a second end pivotable about the hole and adapted to contact a front end of the insert, and the substantially concentric circles defined by the top surface and the bottom surface of the insert are different in radius by an amount substantially equal to a distance along a side surface of the insert between the top surface and the bottom surface of the insert.

24. The cutting tool kit as set forth in claim 23, wherein the rear surface of the recess includes a recessed area and the second end of the key is adapted to be received in the recessed area and contact the rear surface of the insert.

25. A cutting insert, comprising a body formed from a sintered powder, the body including a top surface, a bottom surface, and left and right sidewalls extending between the top surface and the bottom surface, the top surface including a curved portion and the bottom surface including a curved portion, at least part of the bottom surface at least partially defining a clearance surface, the curved portion of the top surface and the curved portion of the bottom surface defining segments of substantially concentric circles that differ in radius by an amount substantially equal to a distance along the sidewalls between the top surface and the bottom surface, the body also including front and rear faces extending between the top and bottom surfaces, an intersection of the front face and the bottom surface defining a cutting edge, wherein the insert defines an arc of not less than 15° and not more than 90° between its front and rear faces.

26. The cutting insert as set forth in claim 25, wherein a length of the insert between the front and rear faces is substantially greater than a length of the cutting edge.

27. The cutting insert as set forth in claim 25, wherein, along at least portions of the length of the curved portions of the top and bottom surfaces, the top and bottom surfaces include grooves or protrusions.

28. The cutting insert as set forth in claim 25, wherein the insert is thinner at the rear surface than at a cutting edge portion of the insert.

29. The cutting insert as set forth in claim 25, wherein the insert is indexable.

30. The cutting insert as set forth in claim 29, wherein a cutting edge is disposed at each end of the bottom surface of the insert.

31. The cutting insert as set forth in claim 30, wherein the bottom surface of the insert includes a clearance surface adjacent each cutting edge.

32. The cutting insert as set forth in claim 31, wherein each clearance surface is substantially flat.

33. The cutting insert as set forth in claim 25, wherein a rear surface of the insert is an abutment surface for abutting a surface of a toolholder.

34. The cutting insert as set forth in claim 25, wherein a surface of the insert disposed remote from a rear surface of the insert is an abutment surface for abutting a surface of a toolholder.

35. A method for positioning an insert relative to a toolholder, comprising:
positioning an insert having front surface, a top surface, a bottom surface, and a stop surface at a front end of a recess in a toolholder, the recess having a top surface and a bottom surface;
positioning a first end of a key tool in a hole in the toolholder, the top surface of the insert including a curved portion, the bottom surface of the insert including a curved portion, at least part of the bottom surface at least partially defining a clearance surface, the top surface of the recess including a curved portion, and the bottom surface of the recess including a curved portion, and the hole in the toolholder being disposed at a centerpoint of substantially concentric circles along which the curved portion of the top surface of the insert, the curved portion of the bottom surface of the insert, the curved portion of the top surface of the recess, and the curved portion of the bottom surface of the recess are disposed, the concentric circles along which the curved portions of the top surface and the bottom surface of the insert are disposed differing in radius by an amount substantially equal to a distance along a side surface of the insert between the top surface and the bottom surface of the insert;
positioning a second end of the key tool against the front surface of the insert; and
pivoting the key tool about the hole such that the second end of the key tool contacts and applies a force to the front surface of the insert through the second end of the key tool until the stop surface of the insert abuts against a stop surface of the recess.

36. The method for positioning an insert as set forth in claim 35, wherein the front surface of the insert includes a cutting edge portion and a contact portion remote from the cutting edge portion, the second end of the key tool contacting the front surface of the insert at the contact portion.

* * * * *